April 7, 1970 W. G. SPENCE 3,504,873
CURVED WING STRUCTURE FOR AIRCRAFT
Filed Aug. 28, 1967
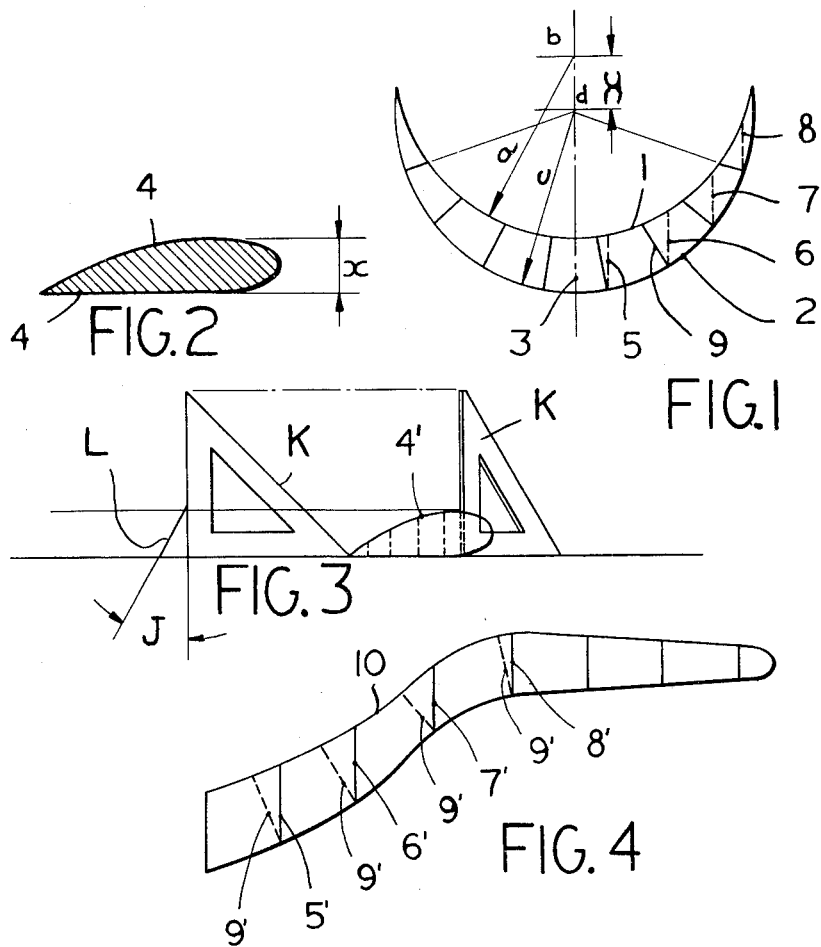
INVENTOR
WILLIAM GEORGE SPENCE
BY Pierre Lespérance
AGENT United States Patent Office 3,504,873
Patented Apr. 7, 1970

3,504,873
CURVED WING STRUCTURE FOR AIRCRAFT
William G. Spence, 2372 Wilson Ave., Notre Dame
de Grace, Montreal, Quebec, Canada
Filed Aug. 28, 1967, Ser. No. 663,738
Claims priority, application Canada, Sept. 2, 1966,
969,490
Int. Cl. B64c 3/10
U.S. Cl. 244—123                                    1 Claim

ABSTRACT OF THE DISCLOSURE

This invention relates to aircraft channel wing structure in which the channel air foil cross-section has a maximum thickness in the horizontal portion and a progressively decreasing thickness in the zones of the channel portion having increasing angles with respect to the horizontal, so as to considerably diminish drag without materially reducing the lifting forces normally produced by the channel wing aircraft.

---

The present invention relates to aircraft wings, more particularly to aircraft wings which are longitudinally curved, such as the Custer channel wing.

In known aircraft having longitudinally curved wings, the lift forces occur generally at right angles to the curvature of the wing at each point along the wing, thereby producing side forces which stand to cancel each other, thus causing drag.

In the channel wing where the pressure is reduced on the upper or inner side of the wing by a power-induced air flow, since the pressure reduction and resultant curvature of the airflow induces a flow of air equal to and opposing the lift, a down wash or out wash of air causes drag by induction (induced drag).

The resultant of these forces cancels each other out in terms of lift as the channel sections approach the vertical. However, these forces do not cancel each other out in terms of drag and must be overcome by the use of power, thereby reducing the aircraft speed.

The general object of the present invention resides therefore in the provision of a longitudinally curved wing structure and more particularly a channel wing structure, in which the amount of out wash or drag produced at the vertically inclined portions of the wing is much reduced as compared to a conventional curved wing, but without materially reducing the lifting forces in the vertical plane.

The aircraft wing in accordance with the invention is characterized by the fact that the wing progressively decreases in thickness, as the skin surfaces become progressively nearer vertical planes, while the skin surfaces maintain true and equal airfoil cross-sections in vertical planes.

Another object of the invention resides in the provision of a curved aircraft wing of the character described, in which the ribs between the skin surfaces are disposed at substantially right angles to said skin surfaces, while preserving the above-noted characteristics to thereby provide for increased strength relative to the weight of the ribs.

The foregoing and other objects of the present invention will become more apparent during the following disclosure and by referring to the drawings, in which:

FIGURE 1 is a schematic front elevation of the geometry of a portion of a curved wing in accordance with the invention;

FIGURE 2 is a cross-section of the wing, taken along the median plane of the curved portion shown at FIGURE 1;

FIGURE 3 is a schematic representation of the manner of determining the profile of the ribs; and FIGURE 4 is a partial front elevation of another longitudinally curved wing portion made in accordance with the present invention.

Referring now more particularly to the drawings in which like reference characters indicate like elements throughout, FIGURE 1 shows a crescent-shaped wing portion which is the extreme condition possible. The radius $a$ at point $b$ is equal in length to radius $c$ at point $d$. Radii $a$ and $c$ mark off longitudinal skin lines 1 and 2.

From the geometry of the arrangement, it will be noted that any vertical line determining the distance between the skin lines 1 and 2 at any point along the crescent-shaped wing, such as lines 5, 6, 7, and 8, are all equal in length and are also equal to the central chord 3, which is equal to the distance $x$ between points $b$ and $d$. This relationship is obviously maintained at each station from the leading to the trailing edge of the airfoil and, therefore, the airfoil section shown at 4 in FIGURE 2 will be equal in the vertical planes at each station longitudinally of the wing.

From the above, it follows that the thickness of the wing progressively decreases as skin surfaces 1 and 2 become progressively more vertical. This is contrary to conventional longitudinally curved wings and more particularly channel type wings in which thicknesses of the wing at the various stations along the channel or curved section are substantially equal.

From the above-noted construction, it naturally follows that the horizontal lifting force components which cancel each other on each side of the curved wing are naturally very much decreased, resulting in a lesser amount of drag without substantially decreasing the amount of vertical lift provided by the curved wing, due to the fact that the airfoil section thickness in vertical planes is substantially equal throughout the length of the wing.

In order to produce ribs of a greater structural strength or, inversely, to produve a wing of less weight as compared to its structural strength, the ribs determining the profile of the airfoil are disposed at right angles to the skins 1 and 2, as shown at 9.

To facilitate manufacture of such ribs having the required airfoil shape, a master template L of the airfoil 4 may be tilted at an appropriate angle J and a rib form 4' traced by means of square K to produce a true rib form that can be positioned at right angle to the skin lines 1 and 2 at the station where the rib form will make angle J with the vertical. Actually, rib form 4' is a shadow projection of template L and is a true shape that may be installed generally at right angles to the skin surfaces 1 and 2 at the station where the rib makes angle J with the vertical.

FIGURE 3 shows also a longitudinally curved wing section with the lines 5', 6', 7', and 8' of equal length in vertical planes and the corrected rib forms 9' installed in the most structurally efficient angle relative to skin line 10.

The crescent shape formed by the geometrical process of FIGURE 1 creates the greatest lift to drag ratio in a channel of semi-circular wing section, or segment thereof, and may be used to alter the pressure reduction pattern within partial propeller shroud to give directional lift.

From the foregoing, it is seen that the wing construction in accordance with the invention emphasizes the vertical lifting properties of a curved wing to obviate or reduce the cancelling forces in other than the vertical plane and to maintain the aerodynamic integrity of the wing section in the vertical plane irrespective of the curvatures and convolutions necessary to accommodate other aerodynamic considerations.

What I claim is:

1. An aircraft Custer channel wing having a curved portion forming an upwardly extending channel portion of the wing fore and aft of the aircraft, said wing curved portion providing an upper and a lower skin surface, said skin surfaces, at all stations from the leading to the trailing edge of the wing, being of partially circular shape in longitudinal section relative to said wing, with equal radii of curvature and vertically spaced centers of curvature, said skin surfaces delimiting airfoil cross-sections of substantially identical shape and size in vertical planes at all stations along said wing curved portion.

References Cited

UNITED STATES PATENTS

| | | | |
|---|---|---|---|
| Re. 21,850 | 7/1941 | Thomson | 244—124 |
| 1,816,678 | 7/1931 | Hilton | 244—117 |
| 2,510,959 | 6/1950 | Custer | 244—12 |
| 2,451,458 | 10/1948 | Watter | 244—124 |
| 2,611,555 | 9/1952 | Custer | 244—12 |
| 3,078,062 | 2/1963 | Fischer | 244—12 |
| 3,065,932 | 11/1962 | Herrmann | 244—34 X |

MILTON BUCHLER, Primary Examiner

T. W. BUCKMAN, Assistant Examiner